(12) United States Patent
Qanaei

(10) Patent No.: US 9,090,325 B1
(45) Date of Patent: Jul. 28, 2015

(54) SUPPLEMENTARY CONTROL SURFACE STRUCTURE FOR AIRPLANES

(71) Applicant: Ahmad Abdullah Al-Jassem Qanaei, Salwa (KW)

(72) Inventor: Ahmad Abdullah Al-Jassem Qanaei, Salwa (KW)

( * ) Notice: Subject to any disclaimer, the term of this patent is extended or adjusted under 35 U.S.C. 154(b) by 0 days.

(21) Appl. No.: 14/503,345

(22) Filed: Sep. 30, 2014

(51) Int. Cl.
*B64C 9/00* (2006.01)
*B64C 9/02* (2006.01)
*B64C 5/06* (2006.01)
*B64C 9/12* (2006.01)

(52) U.S. Cl.
CPC ... *B64C 9/02* (2013.01); *B64C 5/06* (2013.01); *B64C 9/00* (2013.01); *B64C 9/12* (2013.01)

(58) Field of Classification Search
CPC .............. B64C 5/06; B64C 9/00; B64C 9/12; B64C 9/02
See application file for complete search history.

(56) References Cited

U.S. PATENT DOCUMENTS

| 2,643,833 | A | 6/1953 | Ambroise |
| 3,089,666 | A | 5/1963 | Quenzler |
| 3,262,657 | A | 7/1966 | Anker-Holth |
| 6,863,242 | B2 | 3/2005 | Van De Kreeke et al. |
| 7,896,288 | B2 | 3/2011 | Sauvinet |
| 2009/0250551 | A1* | 10/2009 | Sauvinet .......................... 244/87 |
| 2011/0180660 | A1 | 7/2011 | Llamas Sandin |

FOREIGN PATENT DOCUMENTS

DE             103 18 230 A1    11/2003

* cited by examiner

*Primary Examiner* — Nicholas McFall
(74) *Attorney, Agent, or Firm* — Richard C Litman

(57) ABSTRACT

A supplementary control surface structure for airplanes is installed atop the fuselage of an airplane to enhance the roll rate of the airplane and thereby assists in reducing bending loads on the wings by enabling a smaller aileron deflection for a given roll rate. The supplementary control surface structure desirably includes a moveable vertically oriented roll control surface member desirably installed in a vertically oriented fin or strake that extends atop the fuselage from the flight deck to the vertically oriented tail fin. The supplementary control surface structure is desirably interconnected with the conventional aileron controls of the airplane in order to operate in concert with the ailerons. The supplementary control surface structure is also adaptable to other roll control systems, such as spoilers and wing warping.

14 Claims, 5 Drawing Sheets

US 9,090,325 B1

SUPPLEMENTARY CONTROL SURFACE STRUCTURE FOR AIRPLANES

BACKGROUND OF THE INVENTION

1. Field of the Invention

The present invention relates to aerodynamic control systems for aircraft, and particularly to a supplementary control surface structure for airplanes for augmenting the conventional aileron control surfaces used to control motion about the roll axis of the airplane.

2. Description of the Related Art

Powered fixed wing aircraft, i.e., airplanes, are conventionally provided with ailerons at the trailing edge of each wing (for monoplanes) or at least one set of wings (for biplanes and other airplanes having multiple planes of wings). The ailerons move opposite one another to increase lift on one wing while decreasing the lift on the opposite wing, thereby causing the airplane to rotate about its roll axis, i.e., the longitudinal axis of the airplane. The deflection of the ailerons results in changes in the bending loads on the wings, and the downward deflected aileron momentarily increases the aerodynamic lift and corresponding bending loads of that wing over and above that required for level flight.

For any given degree of aileron (or other control) deflection, the stresses imparted to the aircraft structure typically increase with increases in airspeed. This generally can be a squared function, e.g., twice a given airspeed can result in four times the force on the structure for any given control deflection, for example. It will be seen that at some airspeed for a given airplane, it is possible to overstress the airplane structure by applying a relatively excessive control deflection. For this reason, maneuvering speeds are typically calculated for all airplanes, with the maneuvering speed generally defined as a maximum airspeed at which a full control deflection can be applied without overstressing the aircraft structure. Maneuvering speeds not only apply to control deflections, but can also apply to the increased aerodynamic loads that can be imparted to the structure due to sharp-edged gusts in turbulence, for example.

While only a single maneuvering speed (such as for positive forces in pitch) can be developed for a light or relatively small airplane, considering the factors involved, any given airplane can actually have a number of different maneuvering speeds for positive and negative forces in pitch, rolling forces to the left and right, and left and right yawing forces, as well. In fact, these forces can be additive, with a rolling pitch-up resulting in momentary loads on one wing that can exceed its structural limitations, even though the airplane may be flying somewhat below its published maneuvering speed. As the wings of the airplane support substantially the entire weight of the aircraft and also provide sufficient strength to absorb momentary increases in bending loads during rolling maneuvers, it would be desirable to alleviate at least a portion of stresses imposed upon the airplane due to aileron deflection, as can be beneficial in reducing a likelihood of relatively excessive stresses on the wings of the airplane.

Thus, a supplementary control surface structure for airplanes addressing the aforementioned problems is desired.

SUMMARY OF THE INVENTION

The supplementary control surface structure for airplanes includes a moveable vertically oriented roll control surface member for roll control installed along a longitudinal centerline of the airplane on the fuselage thereof typically as can be located at about a center of aerodynamic pressure of the airplane, and includes a relatively low and elongate vertically oriented fin or strake that, in conjunction with the moveable vertically oriented roll control surface member, extends substantially the length of the airplane, such as can extend from the flight deck to the vertical stabilizer. The vertically oriented fin or strake and the moveable vertically oriented roll control surface member are desirably installed atop the fuselage to obviate ground clearance issues. Also, the vertically oriented fin typically has a relatively low aspect ratio (height to length) of about 0.2 or less and a height of about 20% or less of the fuselage vertical height, for example. The moveable vertically oriented roll control surface member installed along the vertically oriented fin or strake is also desirably provided with a relatively low aspect ratio (height to length), e.g., about 0.5 or less, for example. As the supplementary control surface structure is typically installed at some distance above the longitudinal center of the airplane, it can have an effective arm that can provide a rolling moment when combined with the forces developed by the deflection of a control action.

The moveable vertically oriented roll control surface member is deflected to the left or right in concert with aileron deflection, to enhance the roll rate of the airplane for any of various aileron deflections. This can allow the airplane to achieve a given roll rate with relatively less aileron deflection, and can therefore reduce a bending stress on the upward traveling wing of the airplane, for example. The supplementary control surface structure including the moveable vertically oriented roll control surface member thus can enhance the safety of the airplane by providing a relatively greater margin between the bending stress developed in the wings for any of various rolling maneuvers, and an ultimate load factor that can be achieved by the aircraft structure before relatively significant damage can occur.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

The supplementary control surface structure for airplanes is placed to produce an additive angular displacement about the longitudinal or roll axis of an airplane in addition to that provided by the conventional ailerons of the airplane during a rolling maneuver. This additive or supplemental roll input can serve to reduce the amount of aileron deflection required to produce a given rate of roll, and thus can assist in reducing the bending loads on the wings, and particularly the bending load on the upward traveling wing during the roll maneuver, for example.

Figure 1:
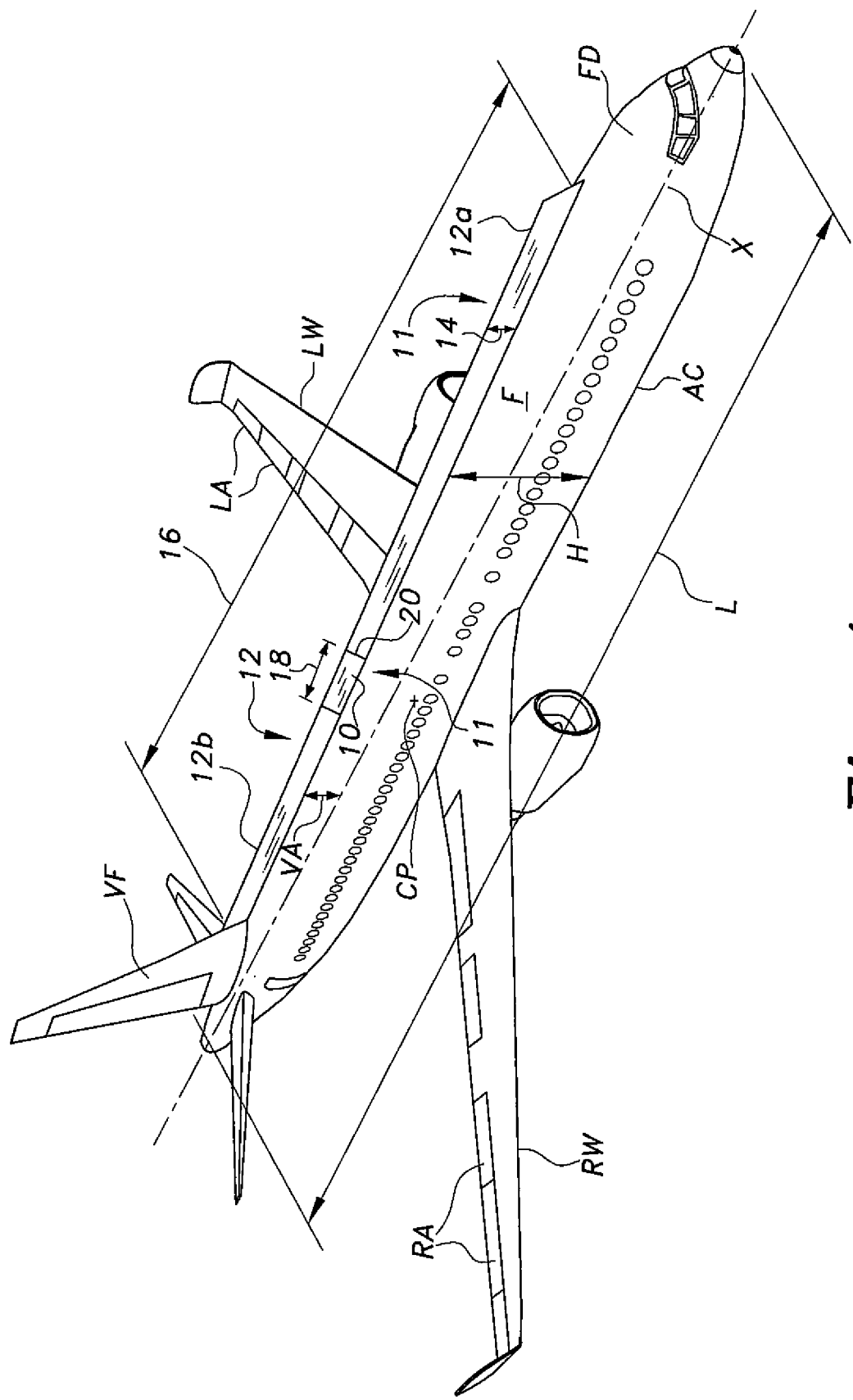
FIG. 1 is an environmental, perspective view of an embodiment of a supplementary control surface structure for airplanes according to the present invention, showing an embodiment of a moveable vertically oriented roll control surface member and a strake or vertically oriented fin installed on an airplane, such as an airline aircraft.
Figure 3:
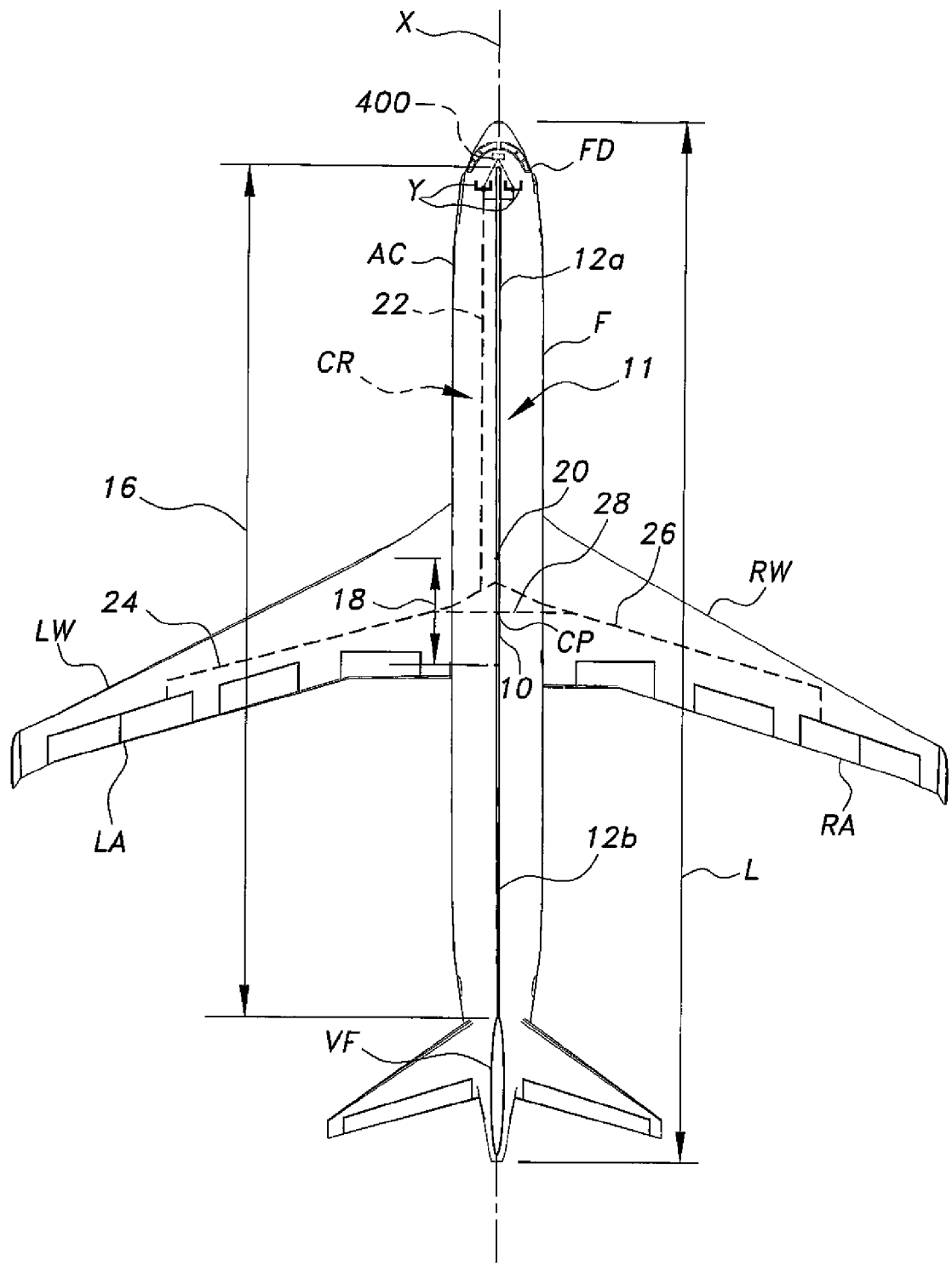
FIG. 3 is a top plan view of the airplane of FIG. 1 incorporating an embodiment of a supplementary control surface structure for airplanes according to the present invention, illustrating an exemplary control interconnect schematic for the ailerons and an embodiment of a moveable vertically oriented roll control surface member according to the present invention.
Figure 4:
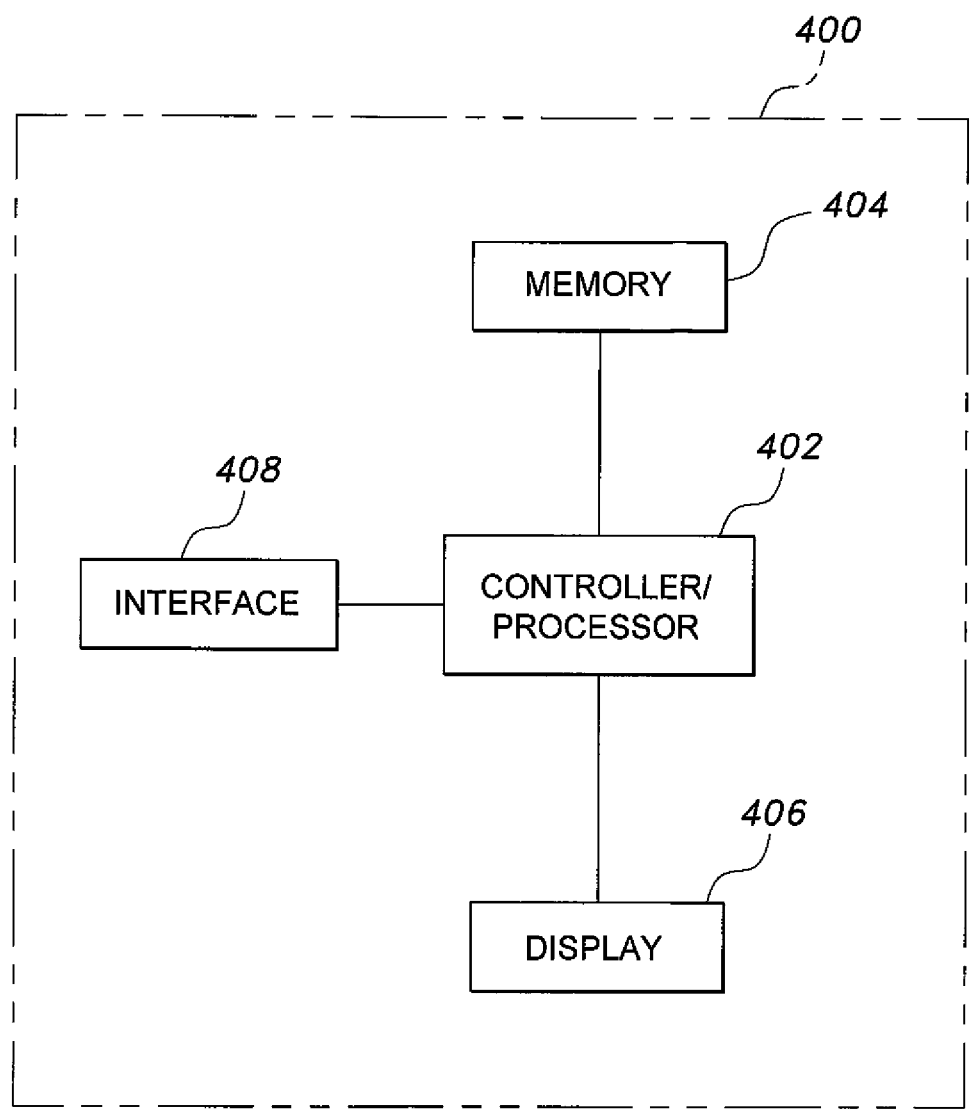
FIG. 4 illustrates a generalized control system for implementing roll control for an airplane in conjunction with the control interconnect schematic of FIG. 3 for the ailerons and an embodiment of a supplementary roll control surface structure according to the present invention.

FIG. 1 of the drawings provides a perspective view of an airplane, such as an airline aircraft or airplane AC, equipped with an embodiment of a supplementary control surface structure 11 that includes a moveable vertically oriented roll control surface member 10 and includes an accompanying strake or vertically oriented fin 12 positioned in conjunction with the moveable vertically oriented roll control surface member 10. The airplane AC is similar to a conventional airplane, but the airplane AC includes the supplementary control surface structure 11 for roll control. The airplane AC has a fuselage F and left and right wings LW and RW, with the wings being respectively equipped with roll control surfaces, such as including left and right ailerons LA and RA, respectively. Each aileron LA and RA can include a single panel, or multiple panels operating differentially, as in the case of many larger airliners, for example. The ailerons LA and RA and the moveable vertically oriented roll control surface member 10 are controlled from the flight deck FD by a control system, such as illustrated by a generalized control system 400 of FIG. 4, illustrated schematically in conjunction with a control interconnect schematic for the ailerons LA and RA and moveable vertically oriented roll control surface member 10 in FIG. 3 and described further below.

A fuselage F of the airplane AC typically defines a longitudinal axis X of the airplane AC about which rolling forces are considered to act collectively, with the fuselage F having a length L along the longitudinal axis X and a height H. The entire airframe structure of the airplane AC typically defines a lateral center of pressure CP, about which the various forces acting laterally on the airplane AC in flight can be considered to act collectively. Also, the strake or vertically oriented fin 12 typically has a relatively low aspect ratio (height to length) of about 0.2 or less and a height of about 20% or less of the fuselage vertical height, for example. The moveable vertically oriented roll control surface member 10 installed along the strake or vertically oriented fin 12 is also desirably provided with a relatively low aspect ratio (height to length), e.g., about 0.5 or less, for example.

The moveable vertically oriented roll control surface member 10 and the strake or vertically oriented fin 12 are placed atop the fuselage F of the airplane AC along, such as desirably vertically centered above, the longitudinal axis X of the airplane AC. It will be noted that the moveable vertically oriented roll control surface member 10 desirably is adapted to be selectively deflected laterally in at least one of a first direction or a second direction based on a corresponding roll control action, and desirably has a first roll control face 10a for lateral deflection in the first direction and a second roll control face 10b for lateral deflection in the second direction, for example.

Also the moveable vertically oriented roll control surface member 10 is desirably located at or about a lateral center of pressure CP of the airplane AC in order to assist in minimizing net lateral pressure forward or aft of the lateral center of pressure CP, and corresponding yaw, of the airplane AC. Thus, lateral deflection of the moveable vertically oriented roll control surface member 10 acting at a distance or vertical arm VA from the longitudinal axis X of the airplane AC can result in essentially a rolling force about the longitudinal axis X without a noticeable force about vertical or lateral axes associated with the airplane AC.

The vertically oriented roll control surface member 10 desirably is installed atop the fuselage F positioned in conjunction with the strake or vertically oriented fin 12 that is immovably or substantially immovably affixed atop the fuselage F vertically above and substantially parallel to the longitudinal axis X of the airplane AC. The strake or vertically oriented fin 12 extends vertically from the fuselage top but is desirably relatively low in height in order to assist in minimizing a substantial destabilization of yaw forces and a substantial degradation of roll rate on the airplane AC.

Typically, the strake or vertically oriented fin 12 can have a height 14 of less than or about twenty percent of the height H of the aircraft fuselage F, for example, as can depend on the use or application or the airplane on which the strake or vertically oriented fin 12 is installed, and should not be construed in a limiting sense. The strake or vertically oriented fin 12 can be in a plurality of parts, such as two parts, for example, with a forward portion 12a extending forward from the moveable vertically oriented roll control surface member 10 to the flight deck FD, and a rearward portion 12b extending from the moveable vertically oriented roll control surface member 10 to a leading edge of the vertically extending tail fin VF of the airplane AC, i.e., substantially the length of the fuselage F, such as extending over a major portion of the fuselage F, as illustrated in FIGS. 1 and 3, for example. The relatively low height 14 of the strake or vertically oriented fin 12 in comparison to its substantial length 16 can result in an aspect ratio, i.e., the ratio of its height 14 to its length 16, of less than or about 0.1, for example, as can depend on the use or application, such as the airplane on which the strake or vertically oriented fin 12 is installed, and should not be construed in a limiting sense.

The moveable vertically oriented roll control surface member 10 is desirably faired or substantially faired and coplanar or substantially coplanar with the strake or vertically oriented fin 12, and thus also has a height 14 equal or substantially equal to that of the strake or vertically oriented fin 12. The moveable vertically oriented roll control surface member 10 is desirably also an elongate structure, but typically has a length 18 considerably less than that of the strake or vertically oriented fin 12. This can result in an aspect ratio (height 14 divided by length 18) of less than or about 0.5 for the moveable vertically oriented roll control surface member 10, for example, as can depend on the use or application, such as the airplane on which the moveable vertically oriented roll control surface member 10 is installed, and should not be construed in a limiting sense.

The leading edge of the moveable vertically oriented roll control surface member 10 is movably attached to the forward portion 12a of the strake or vertically oriented fin 12 by at least one substantially vertically oriented hinge or hinge line 20, with the trailing edge of the moveable vertically oriented roll control surface member 10 moving laterally in accordance with a roll control input to the control system for a roll control action, such as input to the control system 400, for example.

Figure 2A:
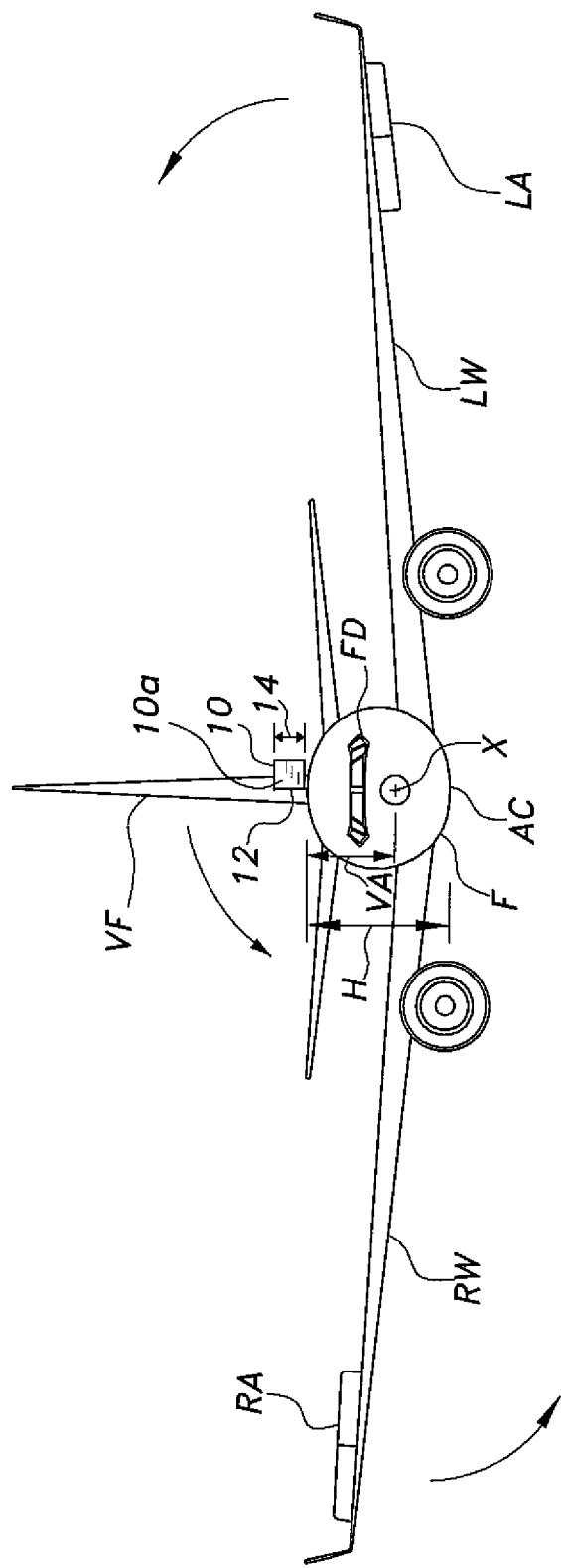
FIG. 2A is a front elevation view of the airplane of FIG. 1 incorporating an embodiment of a supplementary control surface structure for airplanes according to the present invention, showing the ailerons and an embodiment of a moveable vertically oriented roll control surface member deflected to produce a roll to the right relative to the airplane.
Figure 2B:
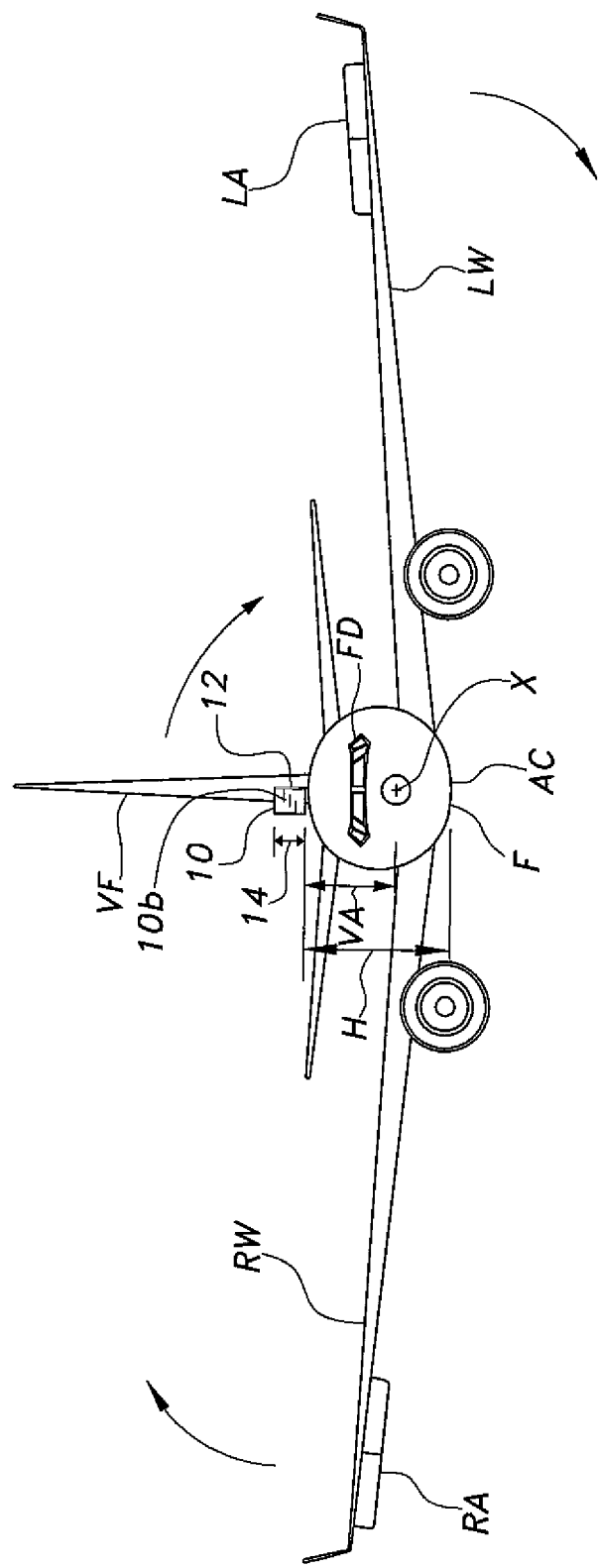
FIG. 2B is a front elevation view of the airplane of FIG. 1 incorporating an embodiment of a supplementary control surface structure for airplanes according to the present invention, showing the ailerons and an embodiment of a moveable vertically oriented roll control surface member deflected to produce a roll to the left relative to the airplane.

FIGS. 2A and 2B illustrate the operation of the moveable vertical roll control surface member 10 in combination with the ailerons LA and RA of the airplane AC. The view is directly toward the nose of the airplane AC from front to rear in FIGS. 2A and 2B. In FIG. 2A, roll control input, such as implemented by the control system 400 in coordinating a roll control action, has been applied to the right relative to the aircraft AC (counterclockwise when viewing the aircraft from the front, as in FIG. 2A), thus lowering the left aileron LA and simultaneously or substantially simultaneously raising the right aileron RA.

Also simultaneously or substantially simultaneously with the above right roll control action, the moveable vertically oriented roll control surface member 10 is deflected in a first direction to the left positioning the first roll control face 10a outwardly to the left. This leftward deflection of the moveable vertically oriented roll control surface member 10 and positioning of the first roll control face 10a results in a counterclockwise, or right rolling force on the airplane AC.

The counterclockwise, or right rolling force on the airplane AC by a lateral deflection of the moveable vertically oriented roll control surface member 10 acts at the distance or the vertical arm VA from the longitudinal axis X of the airplane AC, and the distance or the vertical arm VA from the longitudinal axis X to the moveable vertically oriented roll control surface member 10 can contribute to a rolling force on the airplane AC, such as the counterclockwise, or right rolling force on the airplane AC, illustrated in FIG. 2A.

While the vertical arm VA is considerably shorter than the lengths of the arms from the aircraft center to the centers of pressure of the two ailerons LA and RA, there is an additional rolling force developed by the moveable vertically oriented roll control surface member 10 that provides some assistance in roll about the longitudinal axis X, for example. Thus, in order to achieve a given rate of roll, in view of the additional rolling force developed by the moveable vertically oriented roll control surface member 10, somewhat less deflection of the ailerons LA and RA is typically needed or required for a corresponding roll action.

Such lesser deflection of the ailerons can assist in reducing the additional bending forces on the wings, in this case particularly the left wing LW with the increased lifting force applied thereto due to the downward deflected left aileron LA. This can provide a greater margin of strength to the wing structure, and thus can provide a greater margin of safety, to the airplane AC during rolling maneuvers, for example.

FIG. 2B shows the aircraft AC in the same orientation as shown in FIG. 2A, but the three roll control surfaces including the left aileron LA, the right aileron RA, and the moveable vertical roll control surface member 10 are deflected oppositely to the deflections shown in FIG. 2A. In this regard, in FIG. 2B, roll control input, such as implemented by the control system 400 in coordinating a roll control action, has been applied to the left relative to the aircraft AC (clockwise when viewing the aircraft from the front, as in FIG. 2B), thus raising the left aileron LA and simultaneously or substantially simultaneously lowering the right aileron RA.

Also simultaneously or substantially simultaneously with the above left roll control action, the moveable vertically oriented roll control surface member 10 is deflected in a second direction to the right positioning the second roll control face 10b outwardly to the right. This rightward deflection of the moveable vertically oriented roll control surface member 10 and positioning of the second roll control face 10b results in a clockwise, or left rolling force on the airplane AC. The clockwise, or left rolling force on the airplane AC by a lateral deflection of the moveable vertically oriented roll control surface member 10 similarly acts at the distance or the vertical arm VA from the longitudinal axis X of the airplane AC, and the distance or the vertical arm VA from the longitudinal axis X to the moveable vertically oriented roll control surface member surface 10 can contribute to rolling force on the airplane AC, such as the clockwise, or left rolling force on the airplane AC, illustrated in FIG. 2B. The result is a roll to the left as viewed from the aircraft AC, i.e., clockwise as viewed from the front of the aircraft looking to the rear as in FIG. 2B.

Therefore, the same principles apply in the roll control action depicted in FIG. 2B as apply in the roll control action depicted in FIG. 2A. In view of the additional rolling force developed by the moveable vertically oriented roll control surface member 10, somewhat lesser aileron deflections are typically required or needed for any of various given roll rates, thus assisting in reducing bending stresses in the wing, most particularly the wing that is developing a greater amount of lift with the lowered aileron, i.e., the right wing RW in FIG. 2B, for example.

FIG. 3 of the drawings provides a top plan view of the airplane AC, showing a schematic layout of an exemplary control routing CR, as part of a control system for the airplane AC in conjunction with the control system 400, for roll control, for the moveable vertically oriented roll control surface member 10. In FIG. 3, the roll control input (mechanical, electrical, hydraulic, etc.) is selectively applied using either or both of the control yokes Y in the flight deck FD, such that the movement thereof can provide a control input to the control system 400, which can cause an electrical and/or mechanical communication of the roll control input, such as can be communicated to implement or execute a corresponding roll action, such as can be communicated by or provided along the control routing CR, for example.

The control input is communicated through or travels via the control routing CR, the control routing CR including a first control path 22 to left and right aileron control paths 24 and 26 and to an interconnect control path 28. The left and right aileron control paths 24, 26 can be interconnected, such as in order to actuate the ailerons LA and RA simultaneously or substantially simultaneously with one another for a roll control action. The interconnect control path 28 communicates with the first control path 22 and also connects or communicates with the moveable vertically oriented roll control surface member 10 to actuate the moveable vertically oriented roll control surface member 10, such as in concert with the actuation of the ailerons LA and RA for a control action. The interconnect control path 28 can also communicate with the left aileron LA, and the right aileron RW so as to communicate control actions in conjunction with one another via the control paths 22, 24, 26 and 28, for example. However, the manner and implementation of the roll control actions can depend on the use or application and the type of airplane, and should not be construed in a limiting sense.

FIG. 4 illustrates the generalized control system 400 for the airplane AC as can be used for control of roll control actions and for implementing and coordinating roll control actions, such as by controlling and coordinating movement of roll control surfaces, such as in conjunction with the control routing CR, using embodiments of a supplementary control surface structure, such as the supplementary control surface structure 11 that includes the moveable vertically oriented roll control surface member 10.

It should be understood that the generalized control system 400 can represent, for example, any of various suitable computer devices for use in aircraft, such as the airplane AC, as can include, for example, a stand-alone computer, computer terminal, portable computing device, networked computer or computer terminal, or networked portable device. Data, such as data related to roll control actions, and instructions or programs, such as related to implementing roll control actions, can be entered into the control system 400 via any suitable type of interface 408, and can be stored in computer readable memory 404, which can be any suitable type of computer readable and programmable memory. Calculations and implementation of instructions, such as related to roll control actions, are performed by the controller/processor 402, which can be any suitable type of computer processor, and information, such as related to roll control actions, can be displayed on a display 406, which can be any suitable type of computer display for aircraft, for example.

The controller/processor 402 can be associated with, or incorporated into, any suitable type of computing device for use with aircraft, for example, such as a suitable computer system, a suitable computer device, a programmable logic controller (PLC) or an application specific integrated circuit (ASIC). The display 406, the controller/processor 402, the memory 404, and any associated computer readable media are in communication with one another by any suitable type of data bus, as is well known in the art.

Examples of computer readable media include a magnetic recording apparatus, non-transitory computer readable storage memory, an optical disk, a magneto-optical disk, and/or a semiconductor memory (for example, RAM, ROM, etc.). Examples of magnetic recording apparatus that can be used in addition to the memory 404, or in place of the memory 404, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

The supplementary control surface structure 11 that includes the moveable vertically oriented roll control surface member 10 and includes the strake or vertically oriented fin 12 can be made of any of various suitable materials for aircraft, such as aluminum, aluminum alloys, titanium and titanium alloys, for example, as can depend on the use or application, and should not be construed in a limiting sense.

It should be noted that while the above discussion of the supplementary control surface structure 11 including the moveable vertically oriented roll control surface member 10 in conjunction with the strake or vertically oriented fin 12 has been described and illustrated for use with ailerons, such as the ailerons RA and LA, as the exemplary primary roll control surfaces with which the moveable vertically oriented roll control surface member 10 is used, that other primary roll control surfaces or systems can also incorporate therewith the moveable vertically oriented roll control surface member 10 and the strake or vertically oriented fin 12 if desired.

For example, many airplanes use differential spoilers to control the roll of the aircraft. In this regard, embodiments of a supplementary control surface structure, such as the supplementary control surface structure 11 including the moveable vertically oriented roll control surface member 10 and the strake or vertically oriented fin 12 can be installed and interconnected with such a spoiler roll control system in lieu of or in combination with an aileron control system, if so desired, for example.

Moreover, structurally elastic flying surfaces are being developed, i.e., wing (and or other) aerodynamic surfaces that are twisted and/or imparted with a camber change, etc. to change their coefficients of lift and/or angles of attack in order to achieve a desired roll rate. Also, in this regard, embodiments of a supplementary control surface structure, such as the supplementary control surface structure 11 including the moveable vertically oriented roll control surface member 10 and the strake or vertically oriented fin 12 can be installed on an aircraft having such elastic flying surfaces and interconnected therewith, if so desired, for example.

Various beneficial results, as described herein, for example, can be provided using embodiments of a supplementary control surface structure, such as the supplementary control surface structure 11 including the moveable vertically oriented roll control surface member 10 and the strake or vertically oriented fin 12, with various suitable designs and structures used to produce rolling maneuvers about the longitudinal axis of the airplane. Such embodiments of a supplementary control surface structure, such as the supplementary control surface structure 11 including the moveable vertically oriented roll control surface member 10 and the strake or vertically oriented fin 12 can provide a reduction in the required deflection of the roll control and can likewise provide a reduction in the bending stresses, particularly on the rising wing during such rolling maneuvers.

It is to be understood that the present invention is not limited to the embodiments described above, but encompasses any and all embodiments within the scope of the following claims.

I claim:

1. A supplementary control surface structure for an airplane, the airplane including a fuselage with wings extending laterally therefrom, the fuselage having a longitudinal axis, a length, and a height relative to the longitudinal axis, and roll control surfaces respectively disposed with the wings, the supplementary control surface structure for an airplane comprising:

a moveable vertically oriented roll control surface member for roll control adapted to be disposed atop the fuselage of the airplane along the longitudinal axis thereof, and is adapted to be positioned substantially at a lateral center of pressure of the airplane, the moveable vertically oriented roll control surface member selectively deflecting laterally in at least one of a first direction or a second direction based on a corresponding roll control action; and a vertically oriented fin adapted to be affixed atop the fuselage of the airplane along the longitudinal axis thereof, the moveable vertically oriented roll control surface member being disposed in conjunction with the vertically oriented fin;

wherein the moveable vertically oriented roll control surface member is movably attached to the vertically oriented fin by a substantially vertically oriented hinge line;

wherein the vertically oriented fin extends substantially the length of the fuselage of the airplane along the longitudinal axis thereof.

2. The supplementary control surface structure for an airplane according to claim 1, wherein the vertically oriented fin has an aspect ratio of less than or about 0.1 and a height less than or about twenty percent of the height of the fuselage of the airplane.

3. The supplementary control surface structure for an airplane according to claim 1, wherein the airplane further comprises:

a control system to control roll control actions, the control system being in communication with the moveable vertically oriented roll control surface member and with the roll control surfaces respectively disposed with the wings of the airplane to control and coordinate movement of the moveable vertically oriented roll control surface member and the roll control surfaces respectively disposed with the wings for a roll control action.

4. The supplementary control surface structure for an airplane according to claim 3, wherein the roll control surfaces respectively disposed with the wings comprise ailerons.

5. The supplementary control surface structure for an airplane according to claim 1, wherein the moveable vertically oriented roll control surface member has an aspect ratio of less than or about 0.5.

6. The supplementary control surface structure for an airplane according to claim 5, wherein the vertically oriented fin has an aspect ratio of less than or about 0.1 and a height less than or about twenty percent of the height of the fuselage of the airplane.

7. The supplementary control surface structure for an airplane according to claim 1, wherein the vertically oriented fin has an aspect ratio of less than or about 0.1 and a height less than or about twenty percent of the height of the fuselage of the airplane.

8. The supplementary control surface structure for an airplane according to claim 1, wherein the vertically oriented fin comprises a strake.

9. A supplementary control surface structure for an airplane, the airplane including a fuselage with wings extending laterally therefrom, roll control surfaces respectively disposed with the wings, and a control system, the fuselage defining a longitudinal axis, a length, and a height relative to the longitudinal axis, the supplementary control surface structure for an airplane comprising:
a vertically oriented strake adapted to be substantially immovably affixed atop the fuselage of the airplane along the longitudinal axis thereof and extending substantially the length of the fuselage; and
a moveable vertically oriented roll control surface member disposed within the strake, the moveable vertically oriented roll control surface member selectively deflecting laterally from the strake in accordance with input to the control system.

10. The supplementary control surface structure for an airplane according to claim 9, wherein the moveable vertically oriented roll control surface member is positioned substantially at a lateral center of pressure of the airplane.

11. The supplementary control surface structure for an airplane according to claim 9, wherein the moveable vertically oriented roll control surface member is adapted to be interconnected with ailerons, the ailerons comprising the roll control surfaces respectively disposed with the wings of the airplane, the ailerons moving selectively in concert with the moveable vertically oriented roll control surface member when actuated by the control system.

12. The supplementary control surface structure for an airplane according to claim 9, wherein
the strake has an aspect ratio of less than or about 0.1 and a height less than or about twenty percent of the height of the fuselage of the airplane, and
the moveable vertically oriented roll control surface member has an aspect ratio of less than or about 0.5.

13. An airplane and a supplementary control surface structure therefor, comprising:
an airplane having a fuselage with wings extending laterally therefrom, roll control surfaces disposed with the wings, and a control system, the fuselage defining a longitudinal axis, a length, and a height above the longitudinal axis;
a moveable vertically oriented roll control surface member disposed atop the fuselage, and positioned substantially at a center of the top of the fuselage, the moveable vertically oriented roll control surface member selectively deflecting laterally in accordance with input to the control system; and
a vertically oriented fin substantially immovably affixed atop the fuselage of the airplane along the longitudinal axis thereof and extending substantially the length of the fuselage, the moveable vertically oriented roll control surface member being disposed within the vertically oriented fin;
wherein the moveable vertically oriented roll control surface member is disposed so as to be at a lateral center of pressure of the airplane.

14. The airplane and a supplementary control surface structure therefor according to claim 13, wherein the moveable vertically oriented roll control surface member is adapted to be interconnected with ailerons, the ailerons comprising the roll control surfaces respectively disposed with the wings of the airplane, the ailerons moving selectively in concert with the movable vertically oriented roll control surface member when actuated by the control system.

* * * * *